R. E. HELLMUND.
CONTROL SYSTEM FOR SINGLE PHASE MOTORS.
APPLICATION FILED FEB. 13, 1917.

1,424,300.

Patented Aug. 1, 1922.

7 SHEETS—SHEET 2.

WITNESSES:
Fred. C. Wilharm
D. C. Davis.

INVENTOR
Rudolf E. Hellmund
BY
Wesley G. Carr
ATTORNEY

R. E. HELLMUND.
CONTROL SYSTEM FOR SINGLE PHASE MOTORS.
APPLICATION FILED FEB. 13, 1917.

1,424,300.

Patented Aug. 1, 1922.

7 SHEETS—SHEET 4.

WITNESSES:
Fred. C. Wilharm
D.C. Davis

INVENTOR
Rudolf E. Hellmund
BY
Wesley G. Carr
ATTORNEY

R. E. HELLMUND.
CONTROL SYSTEM FOR SINGLE PHASE MOTORS.
APPLICATION FILED FEB. 13, 1917.

1,424,300.

Patented Aug. 1, 1922.

7 SHEETS—SHEET 7

WITNESSES:
Fred. C. Wilharm
O C Davis

INVENTOR
Rudolf E. Hellmund
BY
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

CONTROL SYSTEM FOR SINGLE-PHASE MOTORS.

1,424,300. Specification of Letters Patent. Patented Aug. 1, 1922.

Application filed February 13, 1917. Serial No. 148,418.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Control Systems for Single-Phase Motors, of which the following is a specification.

My invention relates to systems of control for alternating-current motors of the commutator type, and it has for its object to provide a system of the character designated whereby control apparatus may be used in an extremely efficient and effective manner and, at the same time, an accelerating sequence may be obtained which shall be smooth, uniform and free from sparking, substantially irrespective of variations in the line voltage and of variations in the load on the motor.

Figure 1:
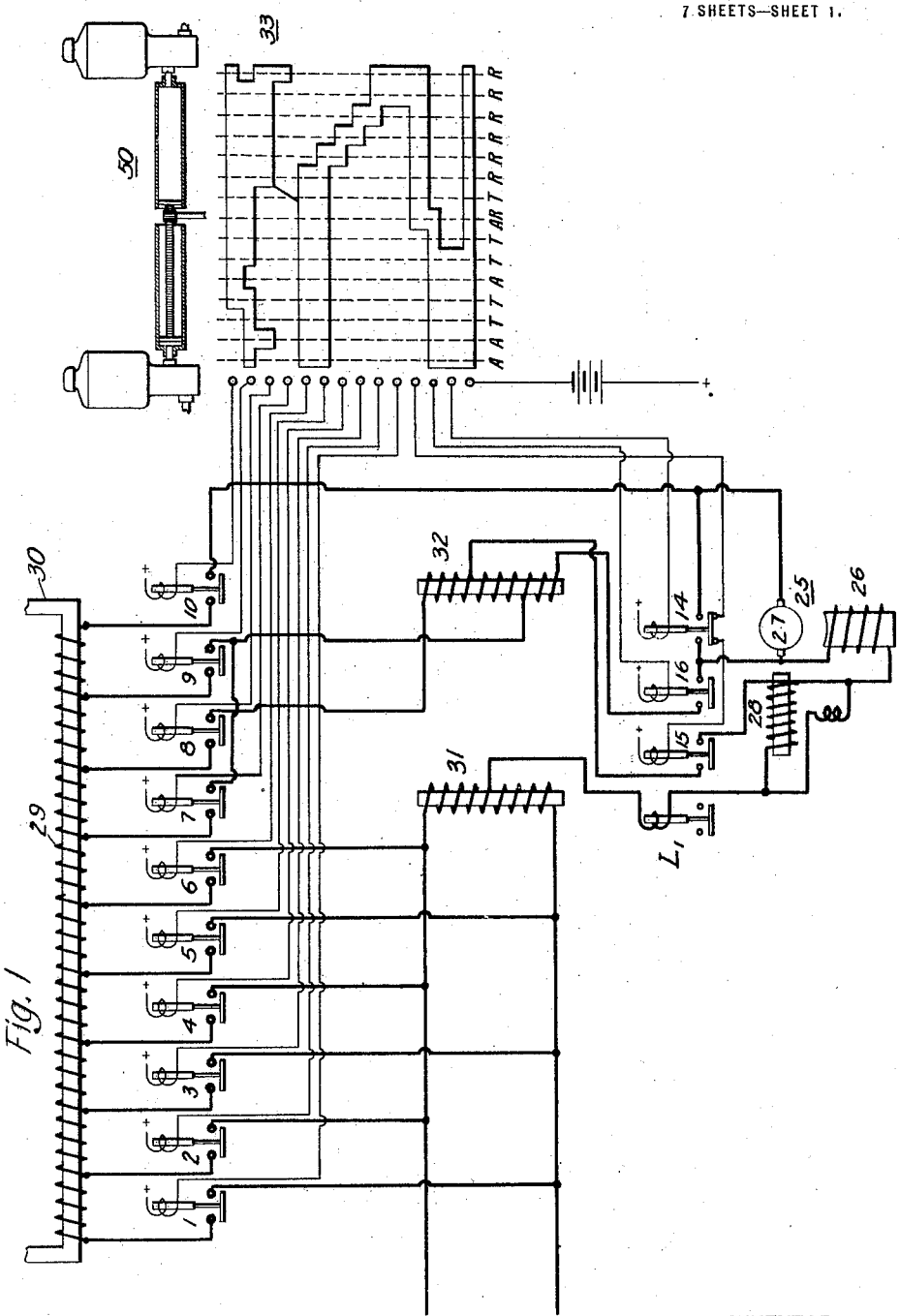
Figure 11:
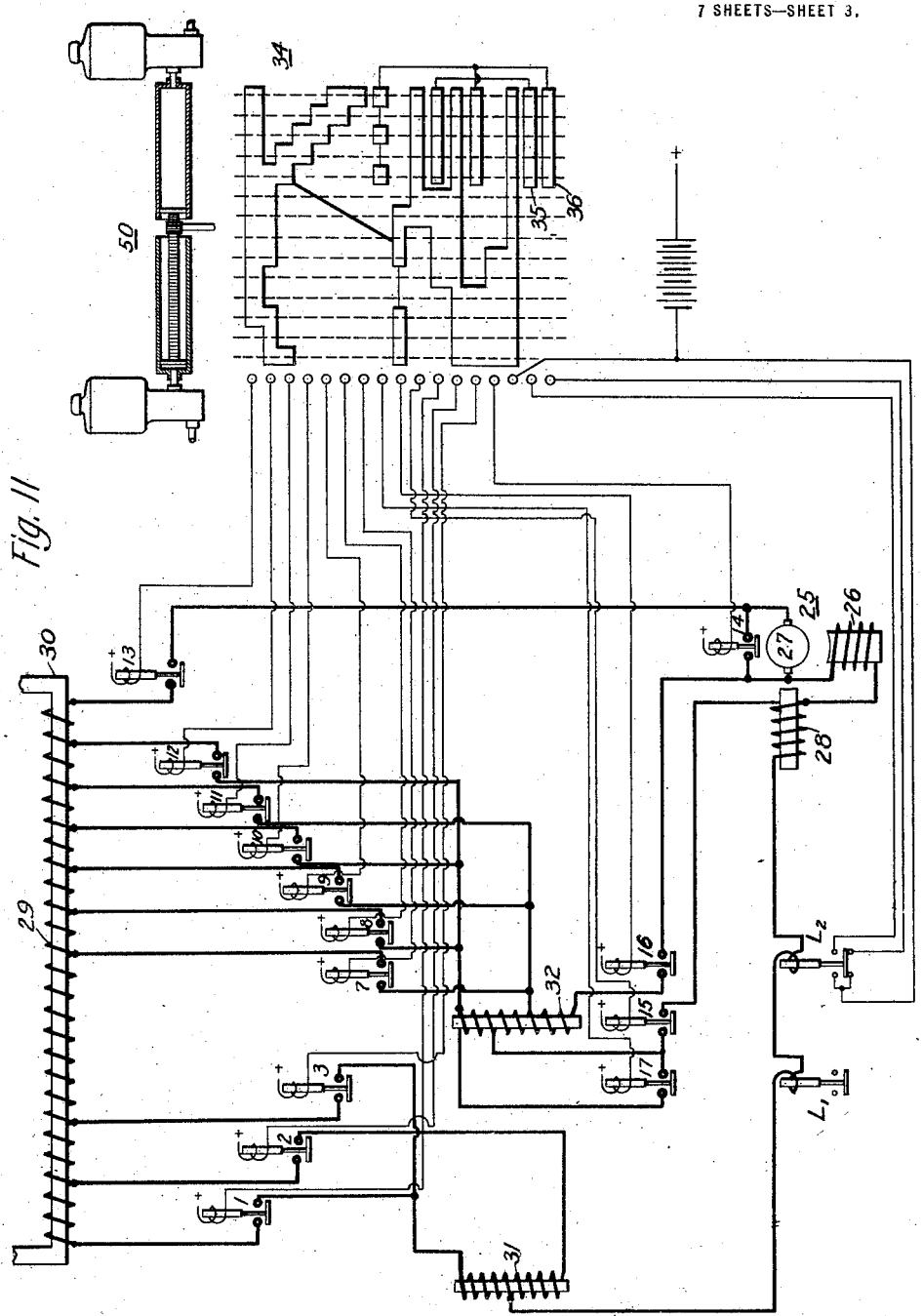
Figure 12:
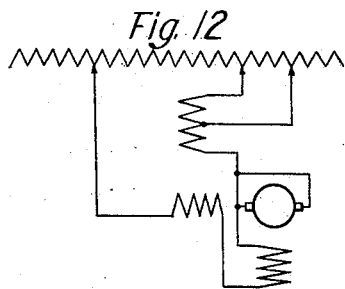
Figure 20:
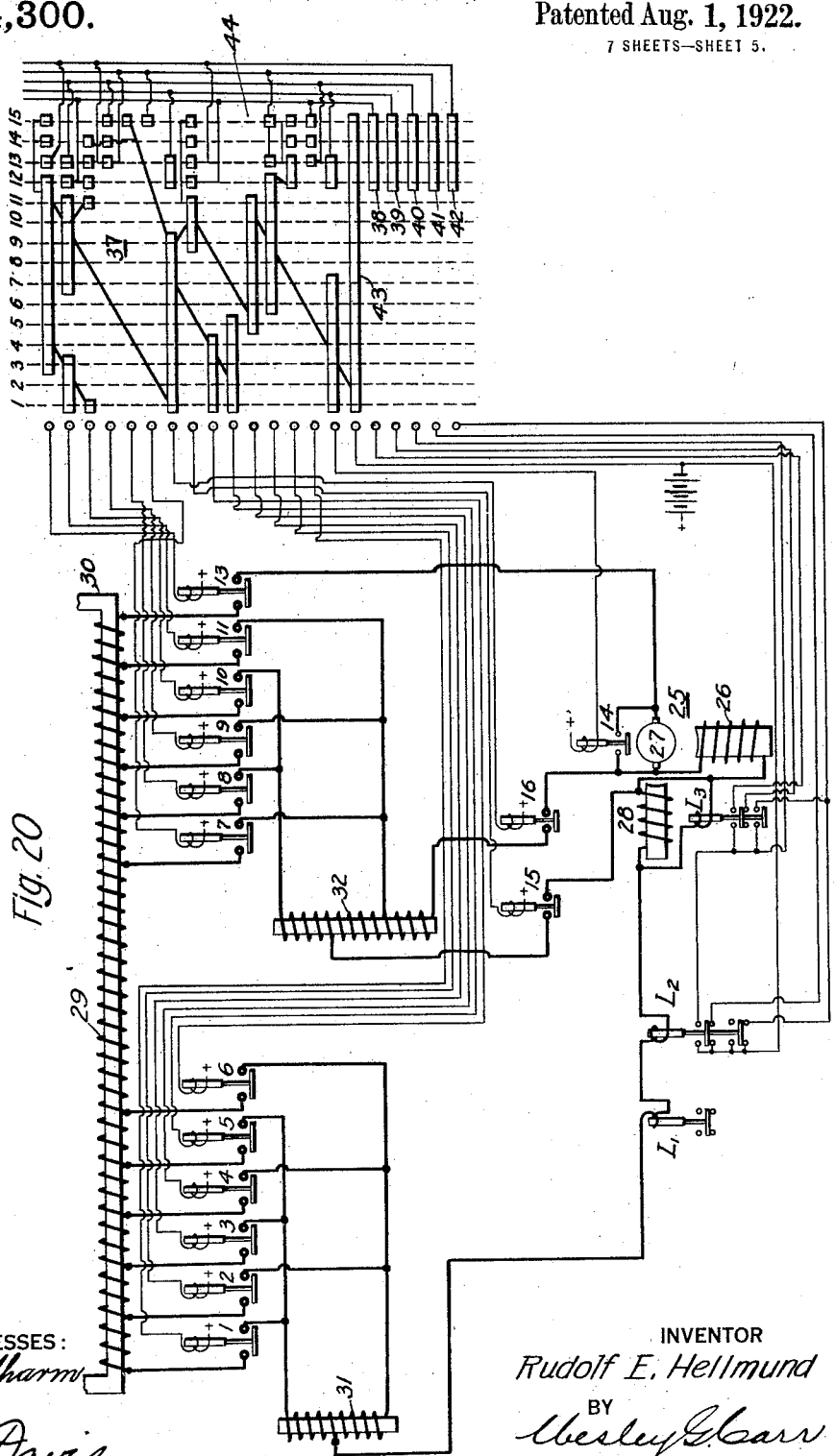
Figure 21:
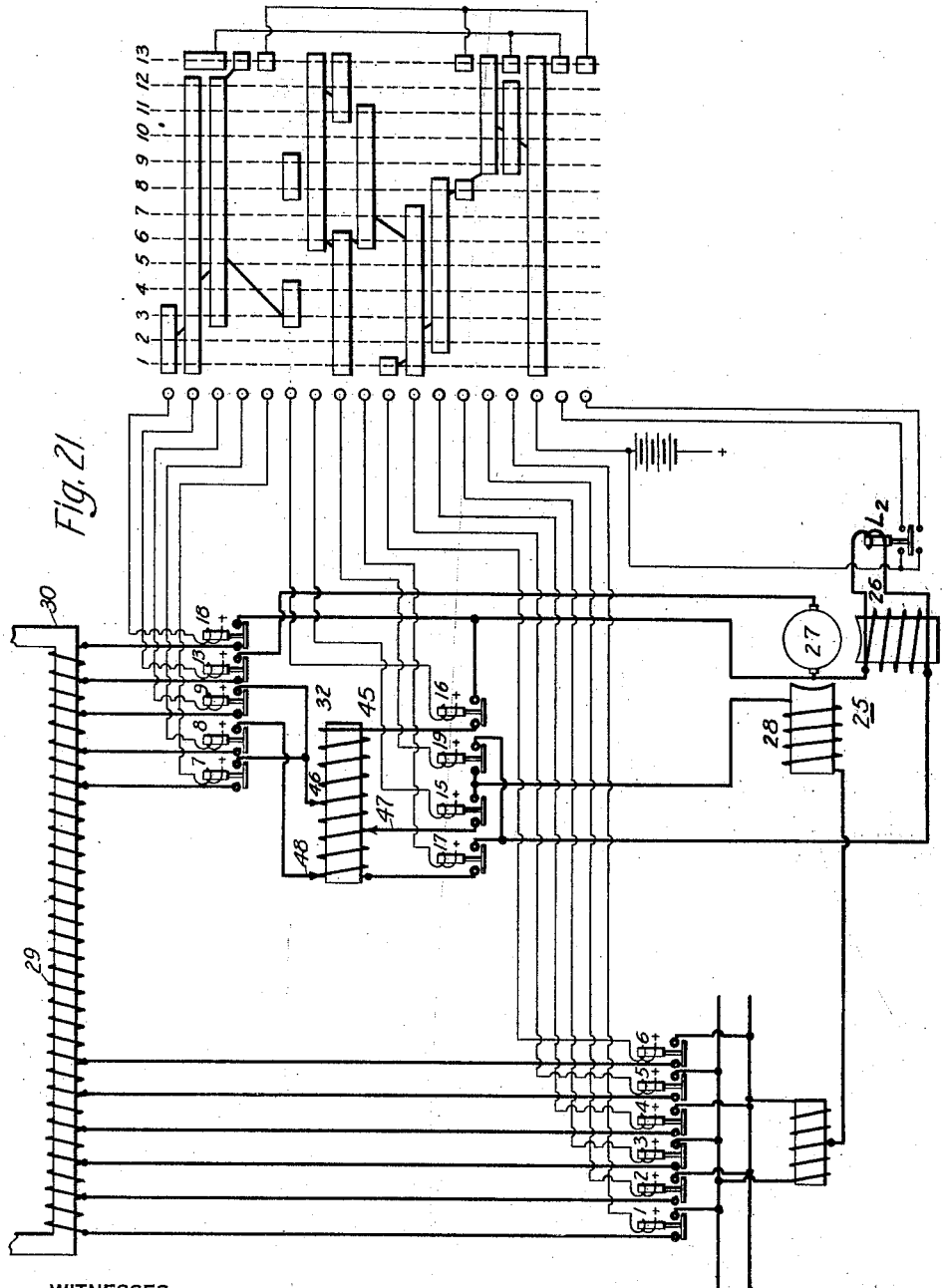

In the accompanying drawings, Fig. 1 is a diagrammatic view of an alternating-current motor of the commutator type, together with appropriate supply and control circuits and auxiliary apparatus embodying one form of my invention; Figs. 2 to 10, inclusive, are simplified diagrammatic views of the system of Fig. 1, illustrating the development in the connections thereof; Figs. 11, 20 and 21 are diagrammatic views of modifications of the system shown in Fig. 1; Figs. 12 to 19, inclusive are simplified diagrammatic views illustrating the development of the connections in the system of Fig. 11; and Figs. 22 to 30, inclusive, are simplified diagrammatic views illustrating the development of the connections in the system of Fig. 21.

The use of preventive reactors in connection with control systems for alternating-current motors is well-known. Such reactors are generally made in the form of an inductive winding which is bridged across adjacent taps in the supply source and which, in turn, is tapped at substantially its midpoint by a lead to the motor. The reactor is thus highly inductive to current attempting to flow from one supply tap to the other but is essentially non-inductive to equal amounts of current flowing from each tap to the motor.

By my invention, I provide means whereby a reactor of the character designated is so modified that, not only may it be employed, at times, as a preventive device but, at other times, it may be employed as an auto-transformer to modify the voltage applied to the motor.

It is well known that, in the acceleration of alternating-current commutator motors, it is desirable to provide a relatively strong cross field at starting in order to compensate for the electromotive force established in the short-circuited armature coils undergoing commutation by transformer action from the main-field winding. Said strong cross field is also desirable with many of the accelerating steps wherewith large current flow temporarily takes place through the motor. With many of the running positions, however, the current through the motor is comparatively small, after the vehicle has been accelerated to the corresponding speed, and it is desirable, under these conditions, that the cross field strength be limited in value.

In accordance with my present invention, I provide means whereby, particularly in systems involving automatic acceleration, the cross field is rendered comparatively strong during accelerating points and is rendered comparatively weak during running points. Furthermore, I may provide means whereby the change-over from the usual repulsion or reversed doubly-fed starting connection to the subsequent doubly-fed running connection may be caused to take place at different times in accordance with the line voltage, thus ensuring that the motor shall not go into the doubly-fed connection unless the line voltage is sufficiently high to provide the proper cross-field excitation. This latter feature per se is described in a copending application of H. T. Morris, Serial No. 32,183, filed June 4, 1915, and assigned to the Westinghouse Electric & Manufacturing Company. Said control feature is a valuable adjunct to the present system, however, and I shall, therefore, describe it in combination therewith.

Referring to the drawing for a more detailed understanding of my invention, I show an alternating-current motor of the single-phase alternating-current motor compensated commutator type at 25, in Fig. 1. Said motor embodies a magnetizing-field winding 26, an armature 27 and a cross or inducing-field winding 28. Energy for the operation of the motor 25 is derived from any suitable source, such, for example, as the secondary winding 29 of a transformer 30.

The voltage applied to the outer terminal of the cross-field winding 28 may be adjusted by means of a plurality of switches 1 to 6, inclusive, and a preventive reactor 31. An intermediate tap for doubly-fed operation may be established to one terminal of the magnetizing-field winding 26 through a switch 15 or to the other terminal of said magnetizing-field winding through a switch 16. The voltage supplied to the switches 15 and 16 is under the control of suitable switches 7, 8, and 9 and of a composite preventive reactor 32. The voltage supplied to the outer armature terminal is controlled by a switch 10, and the armature 27 may be short circuited for repulsion operation by a switch 14.

The switches 1 to 16, inclusive, may be of any desired type, either manually operative or electrically or pneumatically operated from a suitable master controller, all as is well known in the art, the specific type of switches employed forming no part of the present invention. For purposes of illustration, I have shown the switches 1 to 16, inclusive, as of the electrically-operated type, under the control of a controller 33 which may be manually operated or which may be automatically operated, as by a PK head 50 subject to a current-limit switch shown at L¹.

For simplicity and clearness of illustration, I have omitted the return leads of the energizing coils of the different switches, terminating said leads at a + sign and applying a + sign to the appropriate side of the control battery, as is well understood in the art.

In connection with the controller 22, fifteen positions are indicated, those designated by A being for acceleration only, those by T for transition only and those by R for running.

Figure 2:
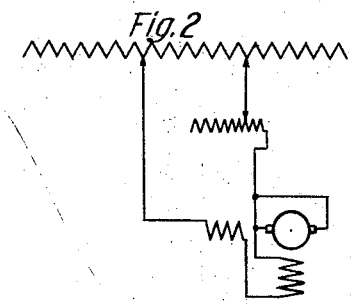
Figure 3:
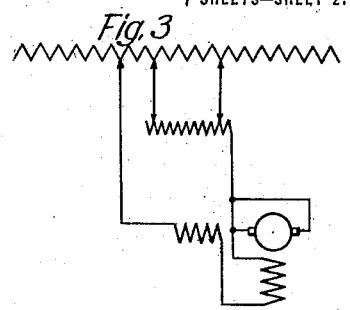
Figure 4:
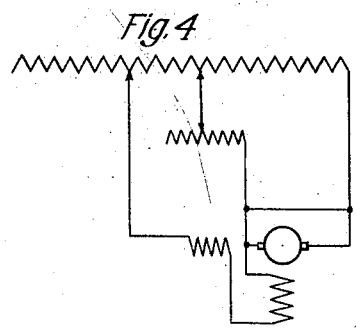
Figure 5:
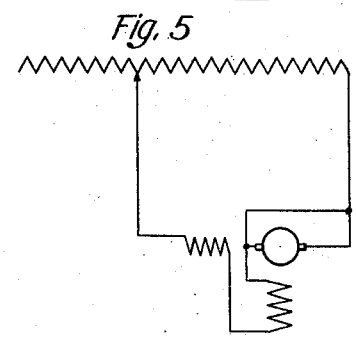

Having thus described the arrangement of a system embodying my invention, the operation is as follows. In the first accelerating position, the switches 5, 6, 9, 14 and 16 are closed, whereupon the connections shown in Fig. 2 are established. The motor 25 is connected for repulsion operation, with a minimum voltage impressed thereupon and with the right-hand third of the device 32 used as a current limiting reactor. In the succeeding position, the switch 8 is closed, whereupon the left-hand two-thirds of the device 32 operates as the primary winding of an auto-transformer to supply a slightly increased voltage to the motor 25, as indicated in Fig. 3.

In positions 3 and 4, the switch 8 is opened and the switch 10 is closed, whereupon the outer terminal of the armature is connected to the right-hand terminal of the supply 29, with the intermediate connection employing the right-hand third of the device 32 as a current-limiting reactor still in circuit, thus effecting a smooth transition. Said positions 3 and 4 are merely for transition and are soon passed over, obtaining the connections of position 5, shown in Fig. 5. The motor is connected for pure-repulsion operation.

Figure 6:
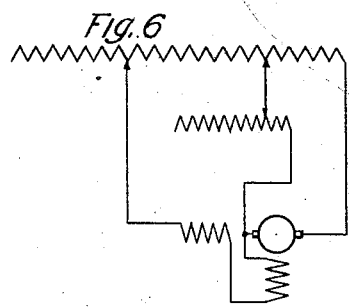
Figure 7:
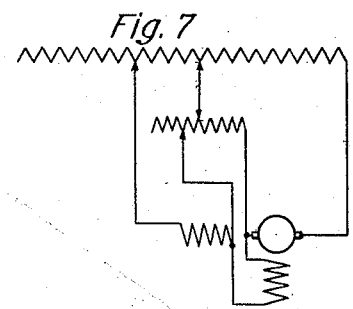
Figure 8:
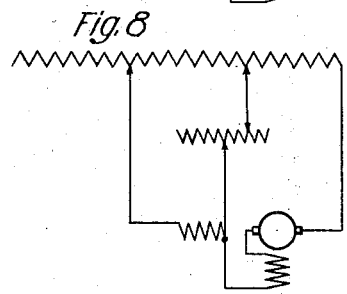
Figure 9:
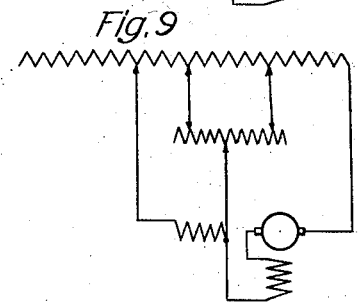
Figure 10:
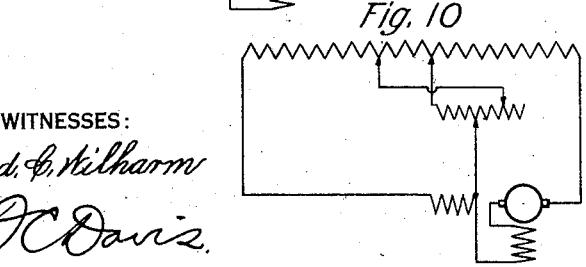

It is now desirable to establish the doubly-fed connections and, accordingly, in the transition positions 6 and 7, the intermediate connection through the right hand third of the reactor 32 is again established and the armature short-circuit through the switch 14 is removed, resulting in the arrangement of Fig. 6, the intermediate tap of the doubly-fed connection being established to the inner armature terminal, so that the magnetizing-field winding is supplied with the cross-field current. Because of the usual two to one ratio between the turns of the cross-field winding, this connection results in the relatively weak magnetizing field necessitated by the commutating conditions. For further acceleration, the intermediate tap should now be transferred to the inner terminal of the cross-field winding so that the magnetizing-field winding may be energized in accordance with the armature current. For this purpose, the switch 15 is closed, as indicated in position 8, establishing the connections of Fig. 7. The right-hand two-thirds of the device 32 is connected in parallel with the magnetizing-field winding 26 and the mid point of said active portion of the device 32 is connected to the supply source. In position 9, indicated in Fig. 8, the transition to the final type of doubly-fed connection is completed, the switch 16 being open and the middle third of the device 32 operating as a current-limiting reactor. For further acceleration of the motor, the voltage on the intermediate tap is raised by the closure of the switch 8, as shown in position 10. The left hand two-thirds of the device 32 now operates as an ordinary preventive coil.

For the concluding running positions, the voltage applied to the outer terminal of the cross-field winding is increased by the proper manipulation of the switches 1 to 6, inclusive, and, in the final position, the switch 9 is opened and the switch 7 is closed, thus bridging the left-hand two-thirds of the device 32 across a new portion of the transformer winding and raising the voltage applied to the intermediate tap.

From the foregoing, it will be obvious that the device 32 functions in three distinct ways. In the first place, different portions thereof are employed solely as current-limiting reactors; in the second place, said device is employed as an auto-transformer for raising the voltage; and finally, said device is employed solely as a preventive reactor of the ordinary type.

Referring to the form of my invention shown in Figs. 11 to 19, inclusive, an alternating-current commutator motor is shown at 25, in all respects similar to the corresponding apparatus in the system of Fig. 1 and deriving energy from a similar source 29. A reactor 32 is shown which, in addition to the connections shown in Fig. 1, may also have its upper third short-circuited by a switch 17. A controller 34, in many respects similar to the controller 33 of Fig. 1, is provided but additional means are incorporated therewith whereby the accelerating sequence in the last five positions is under the control of the load current, as determined by a limit switch $L^2$. As shown, said effect is produced by providing two auxiliary energizing contact members 35 and 36 upon the control drum and by causing the member 35 to be energized only when the load current is comparatively heavy, under which conditions the limit switch $L^2$ is up, and, by causing the segment 36 to be energized only when the load current is comparatively small and the limit switch is accordingly down. As a result of the operation of the limit switch $L^2$, the cross-field winding receives a relatively large current supply and the armature a relatively small applied voltage under heavy-current conditions, whereas, with light-load current, the voltage applied to the armature is increased and that applied to the cross-field winding is decreased.

Figure 13:
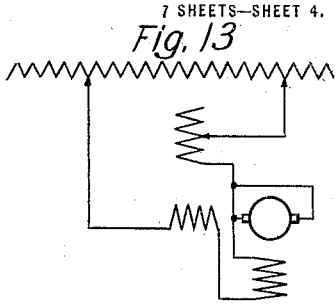

It will be understood that the specific means illustrated for obtaining this load-current effect are simply diagrammatic and are provided for purposes of illustration only, there being a wide variety of possible control systems available whereby the specific results in question may be obtained as, for example, by suitable interlocking between the respective switches, etc. As the present invention is directed principally to the method of accelerating the motor and is substantially independent of the specific means whereby said control sequence is obtained, I have deemed it unnecessary to complicate the control by a showing of other control systems that might be available. Having thus described the arrangemetnt of the system shown in Fig. 11, the operation thereof is as follows. In the first position, the switches 2, 3, 11, 12, 14 and 16 are closed, establishing the connections shown in Fig. 12. The armature is short-circuited for repulsion operation, the upper portion of the device 32 is connected across a portion of the transformer and the lower terminal of said device is connected to the inner armature terminal, the reactor 32 thus acting as an autotransformer, lowering the voltage applied to the motor. A relatively low voltage is applied to the outer cross-field terminal. In the second position, the switch 11 is open, so altering the connections to the reactor 32 that the lower portion thereof operates as a current-limiting device, the result being an increase in the total voltage applied to the motor, all as indicated in Fig. 13.

Figure 14:
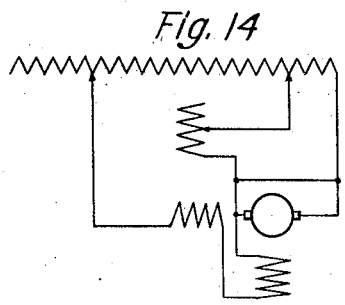
Figure 15:
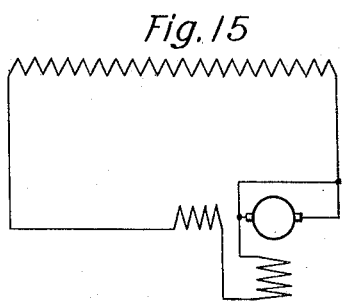

The outer terminal of the armature is next connected directly to the right-hand terminal of the source 29 by the closure of the switch 13 and the connection through the device 32 is then removed, the voltage applied to the outer terminal cross-field winding at the same time being raised, as indicated in Figs. 14 and 15.

Figure 16:
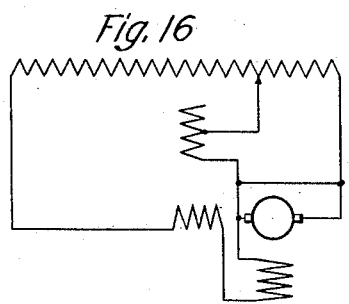
Figure 17:
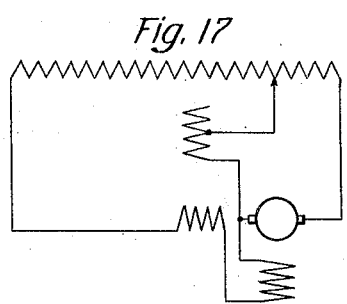

In the sixth accelerating position, preparations are made for changing over to doubly-fed operation by reintroducing the lower third of the device 32 as a current-limiting reactor, as indicated in Fig. 16, and the switch 14 is then opened to remove the repulsion connection, as indicated in Fig. 17 and the seventh accelerating position.

Figure 18:
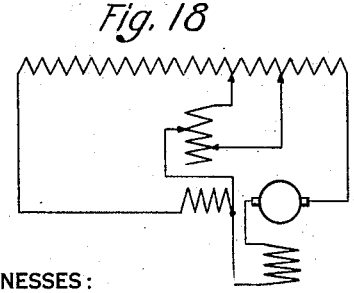

To transfer from doubly-fed operation, with cross-field current in the magnetizing-field winding, to doubly-fed operation, with armature current in the magnetizing-field winding, the device 32 is used as a transition device and the upper portion thereof is then used as a preventive device in raising the voltage on the intermediate tap, as indicated in Fig. 18.

The sequence just described in connection with Fig. 18 obtains only with such heavy-load current that the limit switch $L^2$ is held in its upper position. If the load current be so small in the tenth, twelfth and fourteenth accelerating positions that the limit switch $L^2$ falls, the voltage impressed upon the outer terminal of the cross-field winding is reduced in value from that obtaining with heavy load current and the switch 17 is simultaneously closed, short-circuiting the upper portion of the device 32 and connecting the inner cross-field terminal directly to the supply source, thus, in effect, raising the armature voltage while reducing the cross-field voltage.

Figure 19:
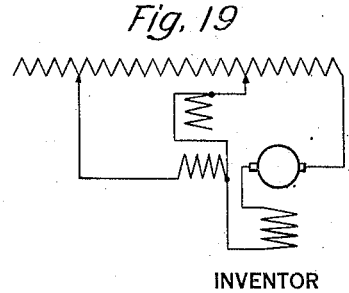

The connections indicated in Fig. 18 are obviously better adapted for operation with heavy-load current as the commutating conditions are such as to demand a relatively strong cross field, whereas the connections of Fig. 19 are better adapted for light-load current operation, wherewith a much weaker cross field is permissible.

It will be noted that the connections of Fig. 19 are established only in the tenth, twelfth, and fourteenth accelerating positions, which are those adapted for use as running positions under light-load conditions. The eleventh and thirteenth positions, while adapted for continuous running with heavy-load current, are intended only as accelerating positions with light current and, as the current is much heavier during the acceleration of a given load than during subsequent running therewith, it is advisable that the switch 17 be not closed during the positions 11 and 13, thus permitting a relatively strong cross field to obtain proper commutation.

The system of Fig. 20 is analogous to the system of Fig. 1 in its use of the reactor 32 and is further similar to the system of Fig. 11 in its use of the limiting switch L². Said system further embodies a voltage limit by which the time of transition from repulsion to doubly-fed operation is partially determined in accordance with the line voltage. A motor 25, designated similarly to the corresponding apparatus in the former figures, receives its energy from the source 29 through appropriate switching devices. A controller 37 is provided and there are incorporated therewith a plurality of energizing segments 38 to 42, inclusive, in addition to the usual battery-energizing segment 43. The current-limit switch L² has its energizing winding in series with the cross-field winding, and the voltage-limit switch L³ has its energizing winding connected across the terminals of a cross-field winding. Suitable switch members are actuated by the devices L² and L³ and are connected in such manner that, in the last four accelerating positions, the segment 38 is energized with L² up and L³ up; the segment 39 with L² up and L³ down; the segment 40 with L² up; the segment 41 with L² down; and the segment 42 with either L² up and L³ up or with L² down. The segments 38 to 42, inclusive, are connected to their various control segments which are active in the last four positions by any suitable means indicated at 44.

The acceleration up through the eleventh position is similar to that already described. For the twelfth accelerating position, with normal line voltage and L² up, it is desirable that the motor be operating doubly-fed and, accordingly, under these conditions, the switches 13, 3 and 2 are closed directly by battery current and the switches 10, 11 and 15 are energized from the segment 38. If the line voltage is low, it is desirable that repulsion operation be continued and, therefore, the switches 16 and 14 are closed from the segment 39, the switches 10, 11 and 15 opening because of the de-energization of the segment 38.

In the thirteenth accelerating position, it is desirable that the operation be of the doubly-fed character, with normal or heavy-load current and with reasonably high voltage, that it remain doubly-fed if the load current is small, even although the line voltage drops abnormally, but that it be of the repulsion type if the load current is normal or heavy and if the line voltage drops abnormally. The switch 1, partially controlling the voltage applied to the outer cross-field winding, should remain closed except under conditions of abnormally low current and is, therefore, energized from the segment 40. The switch 2, also partially controlling the voltage applied to the outer cross-field terminal, is closed at all times and, therefore, is energized directly from the battery segment 43. The switch 3, applying a lower voltage to the outer terminal of the cross-field winding than the switch 1, is closed only under conditions of light load current and is, therefore, energized from the segment 41. The switch 9 is controlled in a similar manner. The switches 10, 13 and 15 should be closed with heavy-load current and normal line voltage or with light-load current, irrespective of the line voltage but should be opened with normal or heavy-load current and abnormally low line voltage. Said switches are, therefore, energized from the segment 42. The switch 11 is closed except for small-load current and is, therefore, energized from the segment 40. The switches 14 and 16 are closed with normal or heavy line current under all voltage conditions and are energized from the segment 39.

In position 14, which is merely an accelerating position, it is essential that a strong cross-field be maintained under all conditions, and the switches 1, 2, 9, 10, 13 and 15 are, therefore, closed therein by battery current.

In the fifteenth or final position, which is adapted for continuous running, the limit switch L³ is ineffective, as transition must have been effected to the doubly-fed connection, and the limit switch L² affects the cross-field and armature voltages in a manner similar to that just described in connection with the system of Fig. 11.

In the foregoing system, the inductive or choking effect of the full magnetizing-field winding was distributed between the two working circuits and resulted at times in a magnetizing-field strength of substantially 75% normal field strength. This weak magnetizing field is undesirable for some of the higher speeds, as it demands too much armature current. This effect may be done away with and the inductive effect of the magnetizing-field winding properly distributed in accordance with any desired ratio by means of the system disclosed in Fig. 21. A motor 25, having its component parts designated as in Fig. 1, is energized from a source 29 through suitable control switches and a reactor 32. Said reactor is tapped at each end, and at two intermediate points. Said taps are designated as 45 to 48, inclusive, as indicated.

Figure 22:
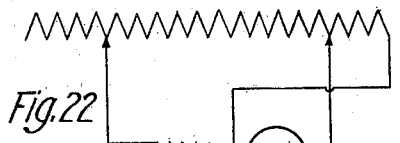
Figure 23:
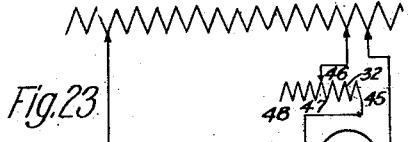
Figure 24:
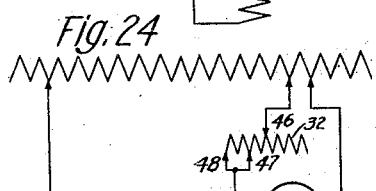
Figure 25:
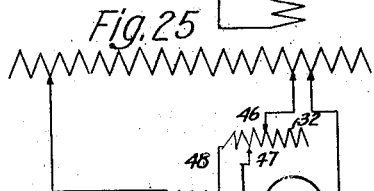
Figure 26:
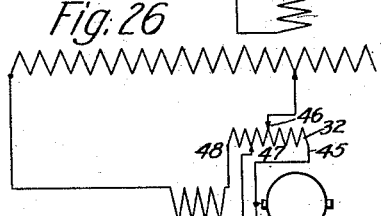

Referring to Figs 22 to 30 for a detailed description of the method of acceleration employed in the system of Fig. 1, the switches 5, 6, 13, 18 and 19 are closed in the first accelerating notch, establishing a reverse doubly-fed connection, as shown in Fig. 22. In the second accelerating notch, the switch 4 is closed, raising the voltage on the outer cross-field connection but without disturbing the reverse doubly-fed connection. In the third accelerating position, the switches 9 and 16 are closed and, in the fourth position, the switch 18 is opened, thus transferring from the reverse doubly-fed connection of Fig. 22 to the ordinary doubly-fed connection of Fig. 23, the portion of the preventive device 32 which is included between the taps 45 and 46 being included in the intermediate lead as a current-limiting device. The intermediate doubly-fed tap is connected to the inner armature terminal. In the fifth and sixth accelerating positions, the switch 16 is opened and the switches 15 and 17 are closed, producing the connections of Fig. 24. The motor is arranged for doubly-fed operation, with the intermediate tap connected to the inner cross-field terminal, thus raising the armature voltage. The portion of the device 32 which is included between the taps 46 and 47 is inserted in the intermediate tap as a current-limiting device. In the seventh accelerating position, the switch 19 is opened, thus causing the portion of the device 32 which is included between the taps 47 and 48 to be inserted in circuit with the cross-field winding. In the eighth and ninth accelerating position, the switch 5 is opened, the switch 3 is closed and again opened and the switch 6 is again closed, establishing the connections of Fig. 26, which connections require special mention as they illustrate a novel use of the inductive device 32. The tap 45 is connected to the inner armature terminal, the tap 46 to the source, the tap 47 to the outer main field terminal and the tap 48 to the inner cross-field terminal. The voltage between the taps 45 and 47 is that of the main field winding and, assuming that the taps in the member 32 are equally spaced, there is produced, by transformer action in the portion of the reactor 32 which is included between the taps 47 and 48, an electromotive force which is substantially one-half of the main-field voltage. Said portion of the reactor 32 is included in series with the cross-field winding and said transformer voltage is, therefore, added to the cross-field voltage. The usual 2 to 1 transformer ratio existing between the cross-field winding and the armature winding thus produces an additional counter voltage in the armature winding equal to substantially one-quarter of the main field voltage. Thus, the inductive effect of the main field winding is distributed between the cross-field winding and the armature winding. By varying the different points of attachment of taps 45 to 48, inclusive, said main field inductive effect may be distributed in accordance with any desired predetermined ratio.

Figure 27:
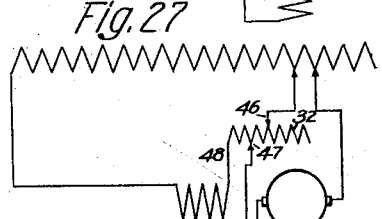
Figure 28:
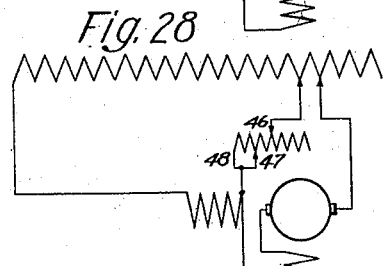
Figure 29:
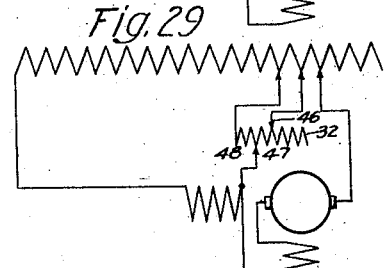
Figure 30:
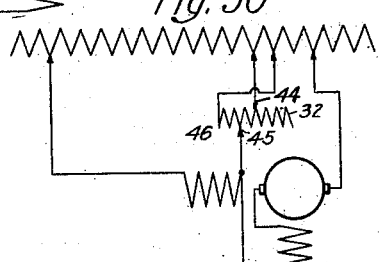

In the tenth accelerating position, the switch 16 is opened, producing the connections of Fig. 27. The portion 46—48 of the reactor 32 is active, serving as an auto-transformer in impressing an intermediate voltage upon the armature and main-field voltages. In the eleventh position, the switch 19 is closed, temporarily establishing the connections of Fig. 28 which are the same as those of Fig. 24 except for the high voltage impressed upon the outer cross-field winding. In the twelfth and thirteenth accelerating positions, assuming heavy-load current so that the limit switch $L^2$ is up, the final running connections shown in Fig. 29 are established. The switches 1, 2, 8, 9, 13, 15 and 19 are closed and the motor is connected for doubly-fed operation, with the intermediate tap connected to the inner cross-field terminal. The points 46 and 48 of the reactor 32 are connected to spaced points in the source, and the intermediate point 47 is connected to the cross-field terminal so that the portion 46—48 of the reactor 32 is acting as an ordinary preventive device. If the load current decreases to such an extent that the limit switch $L^2$ falls, the switches 1, 9 and 13 are opened and the switches 3 and 7 are closed. Thus, the armature voltage is slightly raised by the movement of the intermediate point of attachment toward the left, and the cross-field voltage is lowered, not only by said movement of the intermediate tap but also by the reduction of the voltage applied to the outer cross-field tap. Thus, the proper commutating conditions are established for the light-load current in question.

While I have shown my invention in a plurality of forms, it will be obvious to those skilled in the art that it is susceptible of various other alterations and modifications without departing from the spirit thereof and I desire, therefore, that only such limitations shall be placed thereupon as are imposed by the prior art or are specifically set forth in the appended claims.

I claim as my invention:

1. The method of energizing a dynamo-electric machine of the commutator type provided with a cross-field winding, said machine being associated with a source of alternating-current, a reactor, and suitable switching means therebetween to establish a doubly-fed system of connections including an intermediate tap, which comprises, at times, employing said reactor as a preventive device, at other times employing said reactor solely as a current-limiting reactor, and, at still other times, employing said reactor as an auto-transformer in adjusting the voltage applied to said machine.

2. The method of energizing a dynamo-electric machine of the commutator type provided with a cross-field winding, said machine being associated with a source of alternating current, a reactor, suitable switching means and conductors therebetween to establish a doubly-fed system of connections including an intermediate tap, which comprises, at times, employing said reactor solely as a current-limiting device in adjusting the voltage supplied to said intermediate tap, at other times, employing said reactor as a preventive device in adjusting the voltage supplied to said intermediate tap and, at still other times, employing said reactor as an auto-transformer in adjusting the voltage supplied to said intermediate tap.

In testimony whereof, I have hereunto subscribed my name this 31st day of January 1917.

RUDOLF E. HELLMUND.